(12) United States Patent
Mondragon et al.

(10) Patent No.: US 11,194,066 B2
(45) Date of Patent: Dec. 7, 2021

(54) EARTHQUAKE DETECTION PLATFORM

(71) Applicant: Verizon Patent and Licensing Inc., Arlington, VA (US)

(72) Inventors: Diego Mondragon, Roswell, GA (US); Mourya C. Darivemula, Sugar Hill, GA (US); Aaroon Thowfiq Shahul Hameed, Alpharetta, GA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 350 days.

(21) Appl. No.: 16/367,968

(22) Filed: Mar. 28, 2019

(65) Prior Publication Data
US 2020/0309974 A1    Oct. 1, 2020

(51) Int. Cl.
*G01V 1/00*     (2006.01)
*G06N 20/00*   (2019.01)

(52) U.S. Cl.
CPC ............. *G01V 1/008* (2013.01); *G06N 20/00* (2019.01)

(58) Field of Classification Search
CPC .............................. G01V 1/008; G06N 20/00
See application file for complete search history.

(56) References Cited

U.S. PATENT DOCUMENTS

2019/0340912 A1\* 11/2019 Sellathamby ........ G08B 27/005

\* cited by examiner

*Primary Examiner* — Manuel A Rivera Vargas

(57) ABSTRACT

A device can receive sensor data from a plurality of sensor devices. The sensor data can include information relating to vibrations detected by the plurality of sensor devices. The device can determine, based on the information relating to vibrations, whether the vibrations are likely to be associated with one or more primary waves of a seismic event. The device can predict, based on determining that the vibrations are likely to be associated with the one or more primary waves, a geographic area that is likely to be impacted by one or more secondary waves of the seismic event. The device can transmit, based on predicting the geographic area, and to one or more of a plurality of user equipments, one or more of a notification providing information relating to the seismic event or instructions to perform one or more actions.

20 Claims, 6 Drawing Sheets

100 →

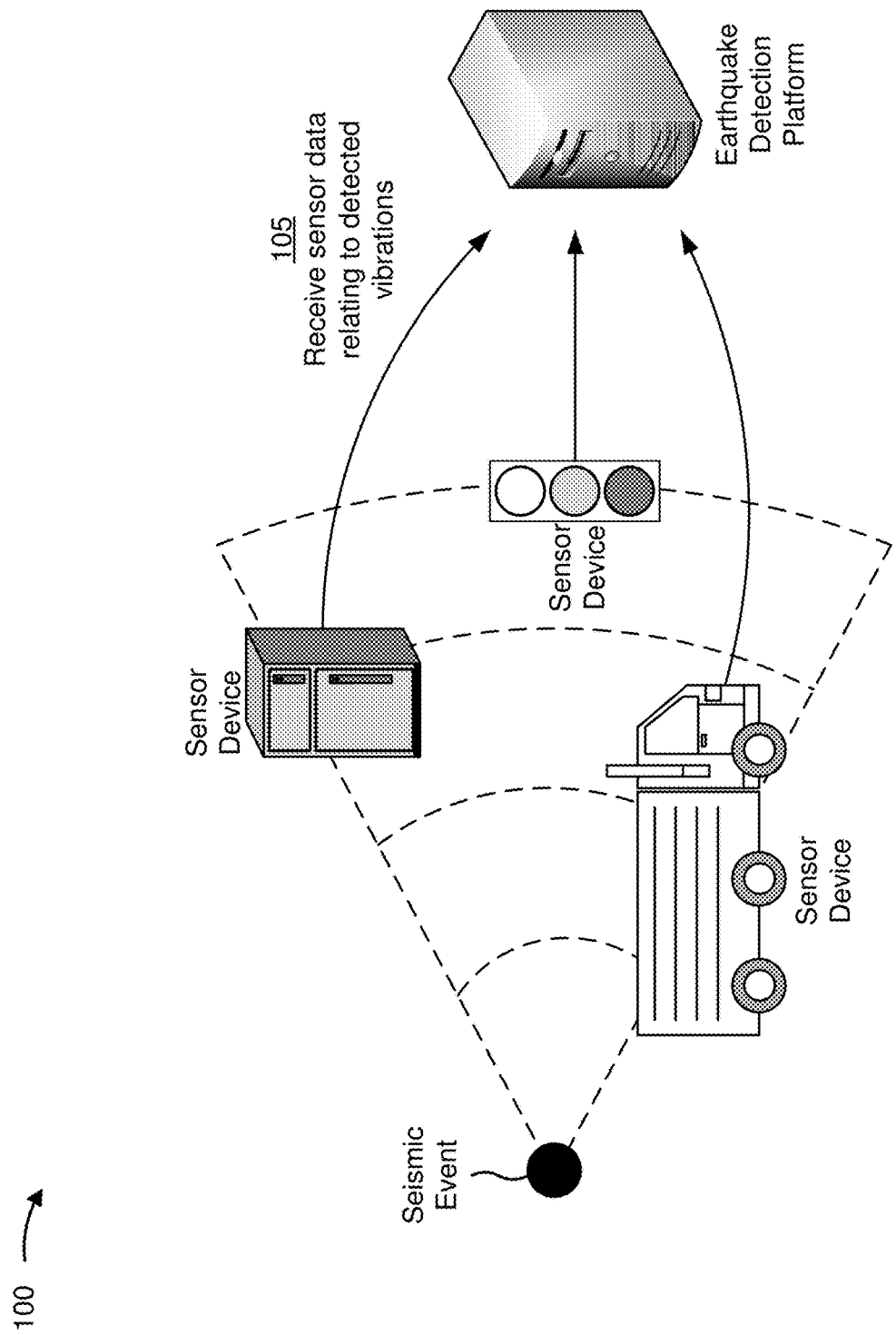

EARTHQUAKE DETECTION PLATFORM

BACKGROUND

Earthquake warning systems can employ sensors, such as seismometers and/or accelerometers, to detect ground vibrations and other ground motions associated with a seismic event. Upon detecting a seismic event, the earthquake warning system can provide a warning relating to the seismic event.

BRIEF DESCRIPTION OF THE DRAWINGS

FIGS. 1A and 1B are diagrams of one or more example implementations described herein.

DETAILED DESCRIPTION OF PREFERRED EMBODIMENTS

Figure 1B:
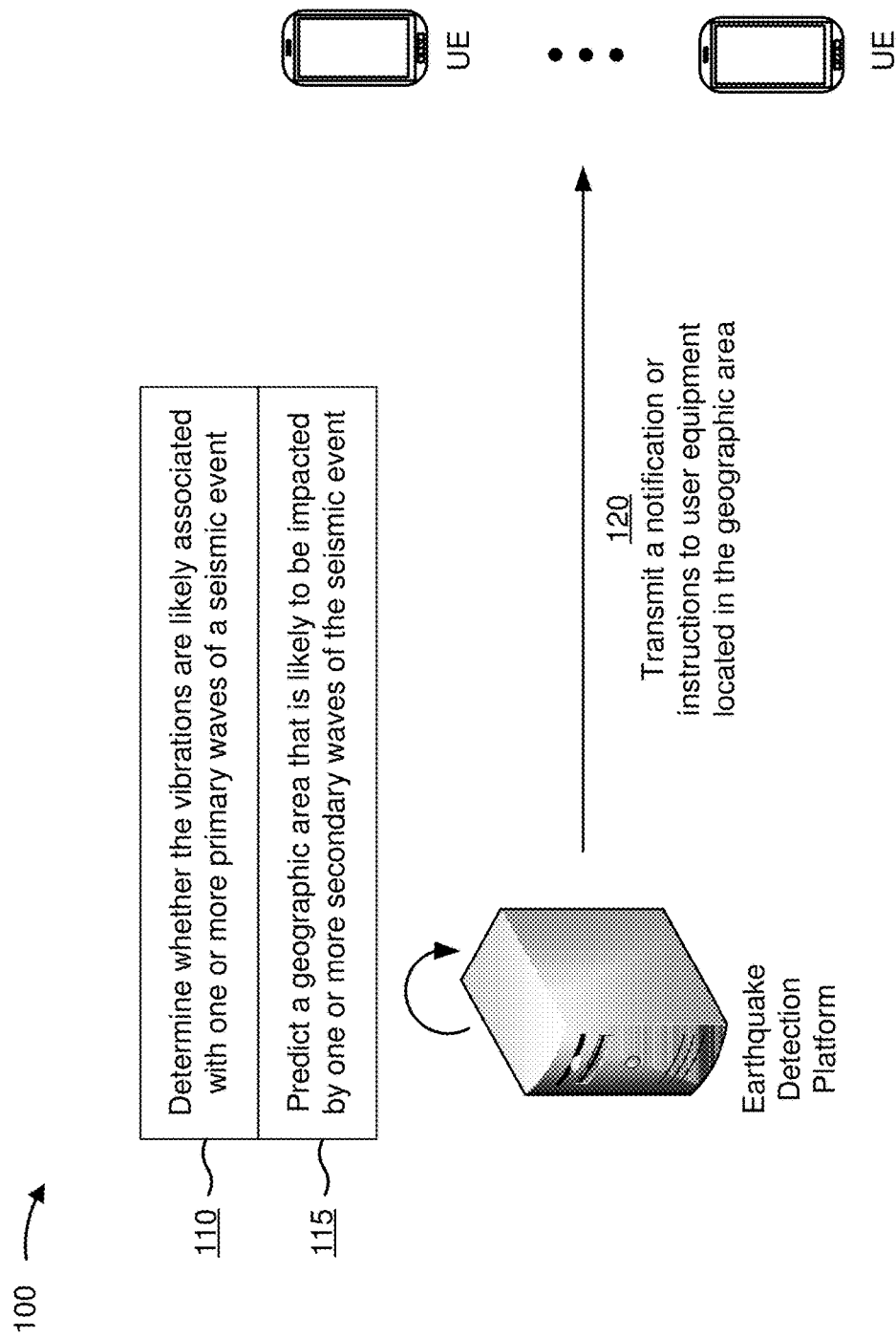

The following detailed description of example implementations refers to the accompanying drawings. The same reference numbers in different drawings can identify the same or similar elements.

As noted above, earthquake warning systems can employ sensors, such as seismometers and/or accelerometers, to detect ground vibrations and other ground motions associated with a seismic event. Upon detecting a seismic event, the earthquake warning system can provide a warning relating to the seismic event. For example, an earthquake warning system can emit an audible or visible alarm to warn nearby individuals of an approaching seismic event. As another example, an earthquake warning system, using a telecommunications link, can provide a notification of an approaching seismic event to user equipments (UEs) associated with individuals, infrastructure, and/or governments.

An earthquake warning system can include tens, hundreds, or thousands of sensor stations reporting data to a central station that interprets the data and determines whether an action should be taken (e.g., manually or by an automated process). Sometimes, the action can include requesting a network to broadcast a message to UEs connected to the network. However, an earthquake warning system usually has a very short time (from a few seconds to a few minutes) in which to issue a warning after detecting a seismic event in an area, before destructive seismic waves arrive in the area. Accordingly, current earthquake warning systems, which rely on several data transmissions and unrelated systems, are inefficient and can fail to provide warnings in time. This can result in injury to individuals, property damage, damage to infrastructure, service outages, and/or the like.

In addition, a sensor station of a current earthquake warning system can include a radio antenna, a solar panel, a large sensor, and an enclosure for various equipment, such as batteries, telecommunications equipment, data storage equipment, and/or the like. As a result, sensor stations can be bulky, difficult to install and maintain, and expensive. Furthermore, due to sensitive equipment and size, sensor stations are usually located away from populated areas. However, if a seismic event were to originate near or within a populated area, sensor stations that are located a distance from the populated area might not detect the seismic event quickly enough to provide a timely warning. Consequentially, current earthquake warning systems can lack a sensor station density needed to timely provide warnings to populated areas, where injury and damage are most likely to occur.

Some implementations described herein can provide for improved earthquake detection and warning. For example, an earthquake detection platform can receive sensor data from a plurality of sensor devices (e.g., Internet of things (IoT) devices). The plurality of sensor devices can collect information relating to vibrations, which can be used by the earthquake detection platform for a function related to seismic events and which can be used by the plurality of sensor devices for one or more functions that are unrelated to seismic events. The earthquake detection platform can determine whether the vibrations are likely to be associated with one or more primary waves of a seismic event, predict a geographic area that is likely to be impacted by one or more secondary waves of the seismic event, and transmit a notification or instructions to one or more UEs, or other devices, located within the geographic area.

In this way, the earthquake detection platform can utilize, for seismic event detection, sensor devices that otherwise perform functions unrelated to seismic event detection. Widespread use of sensor devices for various functions (e.g., vehicle on-board devices, smart appliances, smart home devices, smart city devices, artificial intelligence (AI) assistant devices, and/or the like) permits the earthquake detection platform to detect seismic events by utilizing a vast network of sensor devices. Accordingly, the sensor devices can be located, with improved density, in both populated and unpopulated areas, thereby permitting the earthquake detection platform to detect seismic events with improved speed and accuracy. In this way, the earthquake detection platform is capable of facilitating detection of seismic events in situations when seismometers and/or similar sensors would otherwise be incapable of facilitating detection of the seismic events.

In addition, the earthquake detection platform can be associated with a radio access network (RAN) of a wireless network. For example, the earthquake detection platform can be associated with a base station that can receive sensor data from sensor devices as well as transmit a notification or instructions to UEs within a geographic area likely to be impacted by a seismic event. Accordingly, several data transmissions and systems of an earthquake warning system can be consolidated by the earthquake detection platform. In this way, the earthquake detection platform can provide a warning of an approaching seismic event with improved speed, thereby improving post-event outcomes relating to injury, damage, and/or the like.

FIGS. 1A and 1B are diagrams of one or more example implementations 100 described herein. As shown in FIGS. 1A and 1B example implementation(s) 100 can include an earthquake detection platform that processes sensor data from a plurality of sensor devices.

A sensor device can be an IoT device, a telematics device (e.g., a vehicle on-board device), a user device (e.g., a smart phone, a tablet computer, a handheld computer, a wearable communication device (e.g., a smart wristwatch, a pair of smart eyeglasses), and/or the like), a smart appliance (e.g., a smart refrigerator, a smart dishwasher), a smart home system (e.g., a smart thermostat, a smart alarm system, a smart lighting system), a smart city device (e.g., a traffic sensor device, a roadway sensor device, a smart parking system), and/or the like. The sensor device can include one or more sensors. For example, the sensor device can include one or more sensors that detect vibrations in an environment of the sensor device (e.g., an accelerometer, a gyroscope, a piezoelectric sensor, and/or the like). In some implementations, information relating to vibrations detected by the sensor device is to be used by the sensor device for a function that is unrelated to seismic events. For example, a vehicle on-board device associated with a vehicle can use information relating to vibrations to determine that the vehicle is in motion, to detect a break-in of the vehicle, to awaken from a sleeping mode, and/or the like. In some implementations, the plurality of sensor devices can include one or more sensor devices that utilize information relating to vibrations for a function that is unrelated to seismic events, and one or more sensor devices that utilize information relating to vibrations for a function that is related to seismic events (e.g., a seismometer).

The plurality of sensor devices can transmit information relating to vibrations detected by the plurality of sensor devices to the earthquake detection platform (e.g., an earthquake detection platform including one or more server devices). In some implementations, the information is to be used by the earthquake detection platform for a function that is related to seismic events. For example, the earthquake detection platform can process the information relating to the vibrations to identify one or more primary waves of a seismic event. As another example, the earthquake detection platform can process the information relating to the vibrations to determine a geographic area that is likely to be impacted by one or more secondary waves of the seismic event. As used herein, "primary waves" (P-waves) refer to longitudinal, compressional waves following a seismic event and "secondary waves" (S-waves) refer to transverse, shear waves following the seismic event. P-waves are generally non-destructive and travel approximately 1.7× faster than S-waves, which are generally destructive. Accordingly, P-waves can provide an early indication of a seismic event before S-waves of the seismic event arrive.

In some implementations, the plurality of sensor devices can transmit information to the earthquake detection platform via a RAN of a wireless network (e.g., a 5G network). In some implementations, the earthquake detection platform can be associated with the network. For example, an entity that operates the network can operate the earthquake detection platform. In some implementations, the earthquake detection platform can be implemented at an edge of the network (e.g., a base station of a RAN of the network).

As shown in FIG. 1A, and by reference number 105, the earthquake detection platform can receive sensor data from a plurality of sensor devices. In some implementations, the earthquake detection platform can receive the sensor data as one or more streams of sensor data. Additionally, or alternatively, the earthquake detection platform can receive the sensor data as one or more readings from the plurality of sensor devices (e.g., at regular intervals and/or when vibrations are detected).

The sensor data can include information relating to vibrations detected by the plurality of sensor devices. For example, the information can include readings from an accelerometer, a gyroscope, a piezoelectric sensor, and/or the like of a sensor device. In addition, the information can include location information (e.g., global positioning system (GPS) data), relating to a location of a sensor device, and time information. For example, a reading (e.g., obtained by an accelerometer, a gyroscope, a piezoelectric sensor, and/or the like of a sensor device) can be associated with a location (e.g., a location of a sensor device when the reading is obtained) and a time (e.g., a time when the reading is obtained).

In some implementations, a first portion of the information can be used by the earthquake detection platform for a function that is related to seismic events. For example, the earthquake detection platform can use the first portion of the information to determine whether the vibrations are likely to be associated with P-waves of a seismic event, determine a geographic area that is likely to be impacted by S-waves of the seismic event, transmit a notification or instructions relating to the seismic event to one or more UEs, perform one or more actions in preparation for an impact of the seismic event, and/or the like, as described herein. In some implementations, a second portion of the information can be used by one or more of the plurality of sensor devices for a function that is unrelated to seismic events. In some implementations, the function that is unrelated to seismic events can relate to vehicle tracking, vehicle diagnostics, roadway traffic management, vehicle parking management, home appliance control, and/or the like. For example, a sensor device can use the second portion of the information to detect an interaction with the sensor device by a user or another object, detect a malfunction or an abnormal operation of the sensor device or an associated device, detect an initiation or a completion of an operation of the sensor device or an associated device, and/or the like. In this way, the earthquake detection platform can perform seismic event detection by utilizing an existing network of sensor devices that generally perform functions unrelated to seismic event detection, and therefore, can be widely distributed throughout a geographic area.

As shown in FIG. 1B, and by reference number 110, the earthquake detection platform can determine whether the vibrations are likely (e.g., 51%, 75%, 99%, etc.) to be associated with P-waves of a seismic event. For example, the earthquake detection platform can process the information relating to the vibrations to determine a confidence score for the vibrations. The confidence score can correspond to a measure of confidence that the vibrations are properly classified as a type of seismic wave (e.g., P-waves or S-waves).

In some implementations, the earthquake detection platform can determine whether the vibrations are likely to be associated with P-waves based on a frequency and/or a velocity of the vibrations. In some implementations, the earthquake detection platform can determine that the vibrations detected by a sensor device are likely to be associated with P-waves when the vibrations exhibit a frequency (e.g., a frequency within a frequency band) associated with P-waves of a seismic event (e.g., 0.1-2.0 Hz). Additionally, or alternatively, the earthquake detection platform can determine that the vibrations detected by a sensor device are likely to be associated with P-waves when the vibrations exhibit a velocity associated with P-waves of a seismic event (e.g., 5-8 km/s). For example, the earthquake detection platform can determine a theoretical velocity ($v_p$) for P-waves of a seismic event based on a bulk modulus (K), a shear modulus ($\mu$), and a density ($\rho$) of a ground material where a sensor device is located $$\left(\text{e.g., } v_p = \sqrt{\frac{K + 4/3 \cdot \mu}{\rho}}\right)$$

and compare the theoretical velocity to an actual velocity ($v_a$) of the vibrations based on a wavelength ($\lambda$) and a frequency (f) of the vibrations (e.g., $v_a=\lambda/f$) detected by the sensor device. Continuing with the previous example, the earthquake detection platform can determine that the vibrations are associated with P-waves when the actual velocity is within a threshold range of the theoretical velocity (e.g., ±5%, ±20%, etc.).

In some implementations, the earthquake detection platform can estimate a bulk modulus, a shear modulus, and/or a density of a ground material where a sensor device is located based on a location of the sensor device. For example, using a geologic map, the earthquake detection platform can estimate that a ground material is granite when a location of the sensor device is in a mountainous area, a ground material is sand when a location of the sensor device is in a desert area, a ground material is limestone when a location of the sensor device is in a coastal area, etc. In some implementations, the earthquake detection platform can estimate a bulk modulus, a shear modulus, and/or a density of a ground material where a sensor device is located based on a type of the sensor device. For example, the earthquake detection platform can use a mapping of sensor types to ground materials (e.g., the mapping can associate smart road sensors with an asphalt ground material). After determining an estimate of the ground material, the earthquake detection platform can retrieve a bulk modulus, a shear modulus, and a density of the ground material from a data structure (e.g., a database, a linked list, a table, and/or the like) that associates a ground material with a bulk modulus, a shear modulus, and a density.

In some implementations, the earthquake detection platform can determine that vibrations detected by an individual sensor device are likely to be associated with P-waves. Additionally, or alternatively, the earthquake detection platform can determine that vibrations are likely to be associated with P-waves when a cluster of sensor devices detect vibrations that are likely to be associated with P-waves. For example, the earthquake detection platform can determine that vibrations are likely to be associated with P-waves when the cluster of sensor devices (e.g., that detected vibrations likely to be associated with P-waves) includes a number of sensor devices that satisfies a threshold value (e.g., 5 sensor devices, 20 sensor devices, 100 sensor devices). In this way, the earthquake detection platform can facilitate improved accuracy by reducing an effect of noisy data (e.g., information relating to vibrations that were not caused by P-waves).

In some implementations, the cluster of sensor devices can be associated with a particular geographic area. The particular geographic area can be a city, a county, an area served by a base station of a RAN, and/or the like. Additionally, or alternatively, the cluster of sensor devices can be defined by a particular distance. For example, a first sensor device in the cluster can be no more than a particular distance from a second sensor device in the cluster (e.g., 5 miles, 50 miles, 100 miles, and/or the like). In some implementations, the cluster of sensor devices can be associated with a time period. For example, a time difference from when a first sensor device in the cluster detected the vibrations and a last sensor device in the cluster detected the vibrations can be within the time period (e.g., within 1 second, 5 seconds, 30 seconds, and/or the like).

In some implementations, the earthquake detection platform can determine whether vibrations detected by a plurality of vehicles are likely to be associated with P-waves. The plurality of vehicles can include vehicles that are parked, vehicles that are stopped (e.g., idling), and/or vehicles that are in transit. A vehicle of the plurality of vehicles can be associated with a sensor device (e.g., a sensor device that can detect vibrations, such as an on-board device). For example, the sensor device associated with the vehicle can awaken from a sleeping mode upon detecting vibrations and transmit sensor data that includes information relating to the vibrations to the earthquake detection platform. The earthquake detection platform can determine whether the vibrations are likely to be associated with P-waves. In addition, the earthquake detection platform can verify that the vibrations are likely to be associated with P-waves by determining whether the vehicle is included in a cluster of vehicles (e.g., a cluster of vehicles associated with a particular geographic area, as described above) that detected vibrations that are likely to be associated with P-waves. For example, the earthquake detection platform can verify that the vibrations are likely to be associated with P-waves when the cluster of vehicles includes a number of vehicles that satisfies a threshold value and/or a density of vehicles (e.g., a number of vehicles per square mile) that satisfies a threshold value. In some implementations, the plurality of vehicles and/or the cluster of vehicles also can include one or more roadway sensor devices (e.g., roadway sensor devices embedded in a roadway to perform a traffic management function and/or a traffic analytics function).

The earthquake detection platform can utilize one or more artificial intelligence techniques, such as machine learning, deep learning, and/or the like to determine whether vibrations are associated with seismic waves of a seismic event or caused by another source (e.g., an engine of a vehicle, work being performed at a construction zone, a passing train, and/or the like). In this way, the earthquake detection platform can utilize sensor devices that perform functions that can cause vibrations (e.g., vehicles, dishwashers, and/or the like) or that can be located near sources of vibrations (e.g., traffic sensors embedded in roadways, IoT devices located near construction zones or train stations, and/or the like).

Using information relating to the vibrations, such as times, locations, frequencies, velocities, intensities, and/or the like, the earthquake detection platform can determine whether vibrations are, or can be, seismic waves of a seismic event (e.g., P-waves or S-waves). In this case, the earthquake detection platform can generate a model of vibration classification. For example, the earthquake detection platform can train a model using information that includes a plurality of vibrations relating to P-waves of a seismic event, a plurality of vibrations relating to S-waves of a seismic event, and/or the like. As an example, the earthquake detection platform can determine that past vibrations associated with seismic waves are associated with a threshold probability of being associated with seismic waves. In this case, the earthquake detection platform can determine that a relatively high score (e.g., as being likely to be identified) is to be assigned to vibrations that are determined to be the same or similar as previously identified vibrations of the particular seismic wave (or more frequently identified than past identified vibrations). In contrast, the earthquake detection platform can determine that a relatively low score (e.g., as being unlikely to be identified) is to be assigned to vibrations that are determined to be different than past identified vibrations of the particular seismic wave (or less frequently identified than past identified vibrations).

In some implementations, the earthquake detection platform can perform a training operation when generating the model of vibration classification. For example, the earthquake detection platform can portion information relating to vibrations, such as times, locations, frequencies, velocities, intensities, and/or the like into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the earthquake detection platform can preprocess and/or perform dimensionality reduction to reduce the information relating to vibrations to a minimum feature set. In some implementations, the earthquake detection platform can train the model of vibration classification on this minimum feature set, thereby reducing processing to train the machine learning model, and can apply a classification technique to the minimum feature set.

In some implementations, the earthquake detection platform can use a classification technique, such as a logistic regression classification technique, a random forest classification technique, a gradient boosting machine learning (GBM) technique, and/or the like, to determine a categorical outcome (e.g., that vibrations are associated with P-waves, that vibrations are associated with S-waves, and/or the like). Additionally, or alternatively, the earthquake detection platform can use a naïve Bayesian classifier technique. In this case, the earthquake detection platform can perform binary recursive partitioning to split the data of the minimum feature set into partitions and/or branches and use the partitions and/or branches to perform predictions (e.g., that vibrations are associated with P-waves, that vibrations are associated with S-waves, and/or the like). Based on using recursive partitioning, the earthquake detection platform can reduce utilization of computing resources relative to manual, linear sorting and analysis of data points, thereby enabling use of thousands, millions, or billions of data points to train a model, which can result in a more accurate model than using fewer data points.

Additionally, or alternatively, the earthquake detection platform can use a support vector machine (SVM) classifier technique to generate a non-linear boundary between data points in the training set. In this case, the non-linear boundary is used to classify test data (e.g., data relating times, locations, frequencies, velocities, intensities, and/or the like of vibrations) into a particular class (e.g., a class indicating that the vibrations relate to P-waves, a class indicating that the vibrations related to S-waves, and/or the like).

Additionally, or alternatively, the earthquake detection platform can train the model of vibration classification using a supervised training procedure that includes receiving input to the model from a subject matter expert, which can reduce an amount of time, an amount of processing resources, and/or the like to train the model of vibration classification relative to an unsupervised training procedure. In some implementations, the earthquake detection platform can use one or more other model training techniques, such as a neural network technique. In this case, using the artificial neural network processing technique can improve an accuracy of a model (e.g., the vibration classification model) generated by the earthquake detection platform by being more robust to noisy, imprecise, or incomplete data, and by enabling the earthquake detection platform to detect patterns and/or trends undetectable to human analysts or systems using less complex techniques.

As an example, the earthquake detection platform can use a supervised multi-label classification technique to train the model. For example, as a first step, the earthquake detection platform can map vibrations (e.g., times, locations, frequencies, velocities, intensities, and/or the like) to a seismic wave. In this case, the vibrations can be characterized as a seismic wave or not a seismic wave based on characteristics of the vibrations (e.g., whether a time, a location, a frequency, a velocity, an intensity, and/or the like of a vibration is similar or associated with a seismic wave) and an analysis of the vibrations (e.g., by a technician, thereby reducing processing relative to the earthquake detection platform being required to analyze each activity). As a second step, the earthquake detection platform can determine classifier chains, whereby labels of target variables can be correlated (e.g., in this example, labels can be characteristics of vibrations and correlation can refer to a common seismic wave). In this case, the earthquake detection platform can use an output of a first label as an input for a second label (as well as one or more input features, which can be other data relating to the seismic waves), and can determine a likelihood that a particular vibration that includes a set of characteristics (some of which are associated with a particular seismic wave and some of which are not associated with the particular seismic wave) are associated with the particular seismic wave based on a similarity to other vibrations that include similar characteristics. In this way, the earthquake detection platform transforms classification from a multilabel-classification problem to multiple single-classification problems, thereby reducing processing utilization. As a third step, the earthquake detection platform can determine a Hamming Loss Metric relating to an accuracy of a label in performing a classification by using the validation set of the data. For example, an accuracy with which a weighting applied to each characteristic of a vibration and whether each characteristic of a vibration is associated with a seismic wave, results in a correct prediction of whether vibrations can be classified as a particular seismic wave, thereby accounting for differing amounts to which association of any one characteristic of a vibration influences vibrations being classified as a particular seismic wave. As a fourth step, the earthquake detection platform can finalize the model based on labels that satisfy a threshold accuracy associated with the Hamming Loss Metric and can use the model for subsequent prediction of whether characteristics of vibrations are to result in the vibrations being classified as a particular seismic wave.

As another example, the earthquake detection platform can determine, using a linear regression technique, that a threshold percentage of characteristics of vibrations, in a set of characteristics, are not associated with a particular seismic wave, and can determine that those characteristics are to receive relatively low association scores. In contrast, the earthquake detection platform can determine that another threshold percentage of characteristics are associated with a particular seismic wave and can assign a relatively high association score to those characteristics. Based on the characteristics being associated with a particular seismic wave or not, the earthquake detection platform can generate the model of vibration classification and can use the model of vibration classification for analyzing new vibrations that the earthquake detection platform identifies.

In some implementations, the earthquake detection platform can utilize a model that was trained and provided by another device to classify vibrations as seismic waves. In some implementations, one or more of the plurality of sensor devices can utilize a model to classify vibrations as seismic waves (e.g., a model that was trained and provided by the earthquake detection platform or another device). For example, utilizing the model, a sensor device can determine that vibrations detected by the sensor device are likely to be associated with P-waves of a seismic event and transmit information indicating a detection of P-waves to the earthquake detection platform. In this way, processing of the information relating to vibrations can be distributed to the plurality of sensor devices to thereby reduce a processing burden on the earthquake detection platform.

As shown by reference number 115, the earthquake detection platform can predict a geographic area that is likely to be impacted by S-waves of a seismic event. For example, after determining that the vibrations are likely to be associated with P-waves of a seismic event (e.g., the earthquake detection platform identified the vibrations as P-waves with a confidence score that satisfies a threshold value), the earthquake detection platform can predict a geographic area that is likely to be impacted by S-waves of the seismic event based on the information relating to the vibrations. In some implementations, the earthquake detection platform can predict the geographic area based on information relating to vibrations detected by a cluster of sensor devices, as described above.

In some implementations, the earthquake detection platform, using respective times, locations, frequencies, velocities, and/or intensities of the vibrations detected by the plurality of sensor devices, can predict a geographic area likely to be impacted by S-waves of the seismic event, a direction in which the S-waves are traveling, an intensity at which the geographic area is likely to experience the S-waves, and/or a time when the geographic area is likely to be impacted by the S-waves. For example, based on an order in which sensor devices detected vibrations likely to be associated with P-waves, the earthquake detection platform can determine whether the P-waves are traveling in one or more particular directions, determine whether the P-waves are intensifying or weakening when traveling in one or more particular directions, determine a speed in which the P-waves are traveling in one or more particular directions, and/or the like. Continuing with the previous example, the earthquake detection platform can use this information regarding the P-waves to predict a geographic area likely to be impacted by S-waves of the seismic event, a direction in which the S-waves are traveling, an intensity at which the geographic area is likely to experience the S-waves, and/or a time when the geographic area is likely to be impacted by the S-waves.

In some implementations, the earthquake detection platform can assign a respective confidence score to a prediction of the geographic area, the direction, the intensity, and/or the time. The confidence score can correspond to a measure of confidence that the S-waves are to impact the geographic area, that the S-waves are to travel in the direction, that the geographic area is to experience the S-waves at the intensity, and/or that the geographic area is to be impacted by the S-waves at the time.

In some implementations, the earthquake detection platform can utilize one or more artificial intelligence techniques, such as machine learning, deep learning, and/or the like to determine a geographic area, a direction, an intensity, and/or a time associated with the S-waves in a manner similar to that described above regarding vibration classification. For example, the earthquake detection platform can train a model of S-wave prediction using information relating to vibrations, such as times, locations, frequencies, velocities, intensities, and/or the like, and information that identifies seismic waves (e.g., P-waves or S-waves) associated with the vibrations. The earthquake detection platform can train the model of S-wave prediction to determine, based on information relating to P-waves identified by the earthquake detection platform, a geographic area likely to be impacted by S-waves of a seismic event, a likely direction of the S-waves, a likely intensity of the S-waves, a time that the geographic area is likely to experience an impact of the S-waves, and/or the like.

As shown by reference number 120, the earthquake detection platform can transmit a notification or instructions to a plurality of UEs located within a geographic area (e.g., the geographic area predicted by the earthquake detection platform). For example, after predicting the geographic area that is likely to be impacted by the S-waves of the seismic event (e.g., the earthquake detection platform predicted the geographic area with a confidence score that satisfies a threshold value), the earthquake detection platform can transmit a notification or instructions to one or more of the plurality of UEs located within the geographic area.

In some implementations, the earthquake detection platform can determine UEs located within the geographic area based on location data (e.g., GPS data) of the UEs. Additionally, or alternatively, the earthquake detection platform can determine UEs located within the geographic area using a location algorithm (e.g., an edge computing location algorithm that uses real-time radio signal measurements to determine a location of a UE). Additionally, or alternatively, the earthquake detection platform can determine UEs that are connected to one or more base stations that are located within the geographic area to thereby determine UEs located within the geographic area.

In some implementations, the earthquake detection platform can transmit a notification to one or more of the plurality of UEs located within the geographic area. The notification can provide information relating to the seismic event. For example, the notification can provide information relating to a geographic area that is likely to be impacted by S-waves of the seismic event, an intensity of the seismic event, a time when the geographic area is likely to be impacted by the seismic event, and/or the like. In some implementations, the notification can cause a UE to emit an audible or a visible alarm. In some implementations, the notification can be transmitted to a UE associated with a user. Additionally, or alternatively, the notification can be transmitted to a UE associated with a government, a utility, a transportation carrier or hub, a stadium or arena, and/or the like.

In some implementations, the earthquake detection platform can transmit instructions to one or more of the plurality of UEs located within the geographic area. The instructions can instruct a UE to perform one or more actions relating to the seismic event.

In some implementations, the earthquake detection platform can transmit instructions to UEs associated with infrastructure to perform one or more actions. For example, the earthquake detection platform can transmit instructions to a traffic signaling system associated with a bridge or a tunnel to direct traffic away from the bridge or the tunnel and/or to prevent traffic from entering the bridge or the tunnel. As another example, the earthquake detection platform can transmit instructions to a system associated with a gas filling station, a gas utility, a water utility, and/or the like to pause services. As a further example, the earthquake detection platform can transmit instructions to a system associated with an industrial facility to pause or quarantine processes associated with hazardous chemicals, open flames, and/or the like.

In some implementations, the earthquake detection platform can transmit instructions to UEs associated with a vehicle and/or a dwelling. For example, the earthquake detection platform can transmit instructions to a vehicle on-board device to bring a vehicle to a stop, cut an engine of the vehicle, and/or the like. As another example, the earthquake detection platform can transmit instructions to a smart home system to shut off an oven, a stove, a water heater, a fireplace, and/or the like.

In some implementations, after predicting the geographic area that is likely to be impacted by S-waves and transmitting notifications and/or instructions, the earthquake detection platform can continue to monitor information relating to vibrations detected by the plurality of sensor devices to determine whether the vibrations are likely to be associated with one or more S-waves of the seismic event. For example, based on respective frequencies and/or velocities of the vibrations, the earthquake detection platform can determine whether the vibrations are likely to be associated with one or more S-waves. In some implementations, the earthquake detection platform can determine that the vibrations are likely to be associated with S-waves when a cluster of sensor devices that detected the vibrations (e.g., the vibrations likely to be associated with S-waves) includes a number of sensor devices that satisfies a threshold value.

In some implementations, the earthquake detection platform can use a machine-learning model (e.g., the model of vibration classification, as described above) to determine whether vibrations are likely to be associated with S-waves. After determining that the vibrations are likely to be associated with S-waves (e.g., the earthquake detection platform identified the vibrations as S-waves with a confidence score that satisfies a threshold value), the earthquake detection platform can update one or more machine-learning models (e.g., the model of vibration classification, the model of S-wave prediction, and/or the like) with the information relating to the vibrations and/or information identifying a relationship between P-waves and S-waves of a seismic event (e.g., a time difference between detection of the P-waves and detection of the S-waves, an intensity difference between the P-waves and the S-waves, a location difference between the P-waves and the S-waves, and/or the like).

Although FIGS. 1A and 1B describe an earthquake detection platform as processing various types of data, in some implementations, an edge device (e.g., a server device) deployed at an edge of a network (e.g., as part of the earthquake detection platform or separate from the earthquake detection platform) can perform processing, described herein, of one or more of the various types of data. In some implementations, a 5G network (or another network protocol) can be utilized to connect an edge device with an earthquake detection platform, a sensor device, a UE, and/or the like to reduce a latency of data communications, to conserve bandwidth, and/or the like. In this way, various functions relating to identifying seismic waves, predicting a geographic area likely to be impacted by S-waves, and/or transmitting notifications or instructions to UEs can be integrated by the edge device to facilitate efficient and speedy earthquake detection and warning.

As indicated above, FIGS. 1A and 1B are provided as one or more examples. Other examples can differ from what is described with regard to FIGS. 1A and 1B.

Figure 2:
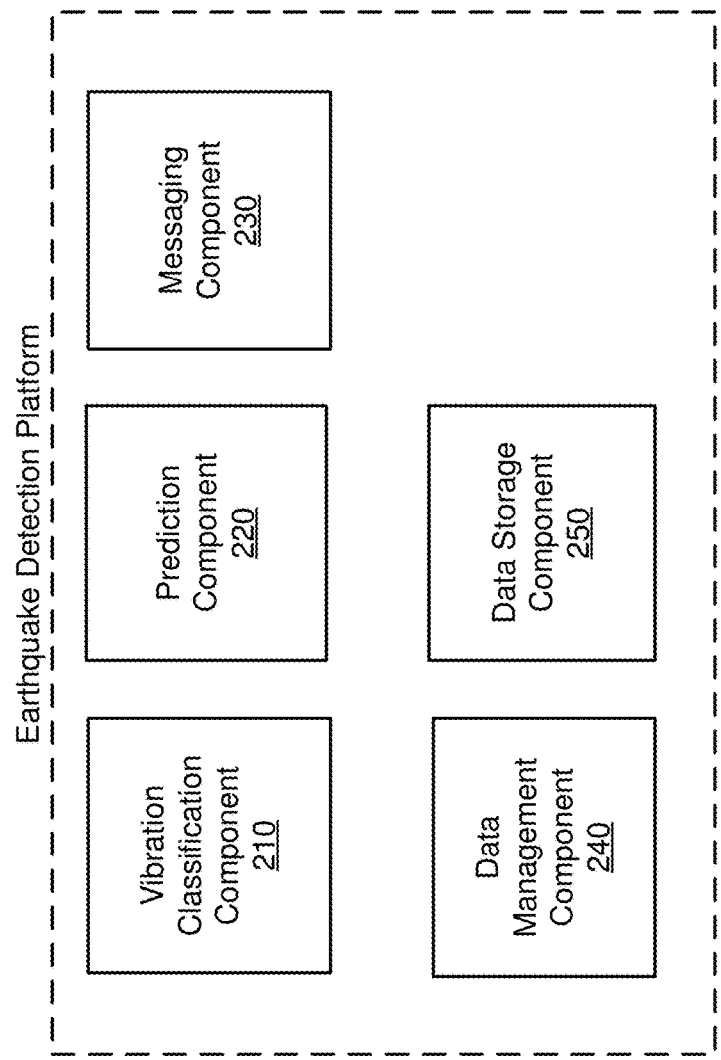
FIG. 2 is a diagram of an example implementation described herein.

FIG. 2 is a diagram of an example implementation 200 described herein. FIG. 2 shows example components of an earthquake detection platform.

As shown in FIG. 2, the earthquake detection platform can include a vibration classification component 210. For example, the earthquake detection platform can use vibration classification component 210 to determine whether vibrations detected by a plurality of sensor devices are likely to be associated with P-waves of a seismic event, to determine whether vibrations detected by the plurality of sensor devices are likely to be associated with S-waves of the seismic event, and/or the like in a manner similar to that described elsewhere herein. In some implementations, vibration classification component 210 can include a machine-learning model (e.g., a model of vibration classification) that can output a classification of the vibrations detected by the plurality of sensor devices as P-waves or S-waves. In some implementations, the classification can be associated with a probability that identifies a confidence level that the classification is correct.

As further shown in FIG. 2, the earthquake detection platform can include a prediction component 220. For example, the earthquake detection platform can use prediction component 220 to predict, based on the vibrations detected by the plurality of sensor devices, a geographic area that is likely to be impacted by S-waves of the seismic event, a direction in which the S-waves are traveling, an intensity at which the geographic area is likely to experience the S-waves, a time when the geographic area is likely to be impacted by the S-waves, and/or the like in a manner similar to that described elsewhere herein. In some implementations, prediction component 220 can include a machine-learning model (e.g., a model of S-wave prediction) that can output information identifying the geographic area (e.g., coordinates that define the geographic area, information identifying one or more base stations of a RAN within the geographic area, and/or the like), the direction of the S-waves, the intensity of the S-waves, and/or the time when the geographic area is likely to be impacted by the S-waves.

As further shown in FIG. 2, the earthquake detection platform can include a messaging component 230. For example, the earthquake detection platform can use messaging component 230 to send a notification, a set of instructions, and/or the like in a manner similar to that described elsewhere herein. As further shown in FIG. 2, the earthquake detection platform can include a data management component 240. For example, the earthquake detection platform can use data management component 240 to receive, store, process, modify, access, and/or the like data described herein. As further shown in FIG. 2, the earthquake detection platform can include a data storage component 250. For example, data storage component 250 can include a data structure used to store data, results of analyses, and/or the like.

As indicated above, FIG. 2 is provided merely as an example. Other examples can differ from what is described with regard to FIG. 2. The number and arrangement of components shown in FIG. 2 are provided as an example. In practice, the earthquake detection platform can include additional components, fewer components, different components, or differently arranged components than those shown in FIG. 2. Additionally, or alternatively, a set of components (e.g., one or more components) of the earthquake detection platform can perform one or more functions described as being performed by another set of components of the earthquake detection platform.

Figure 3:
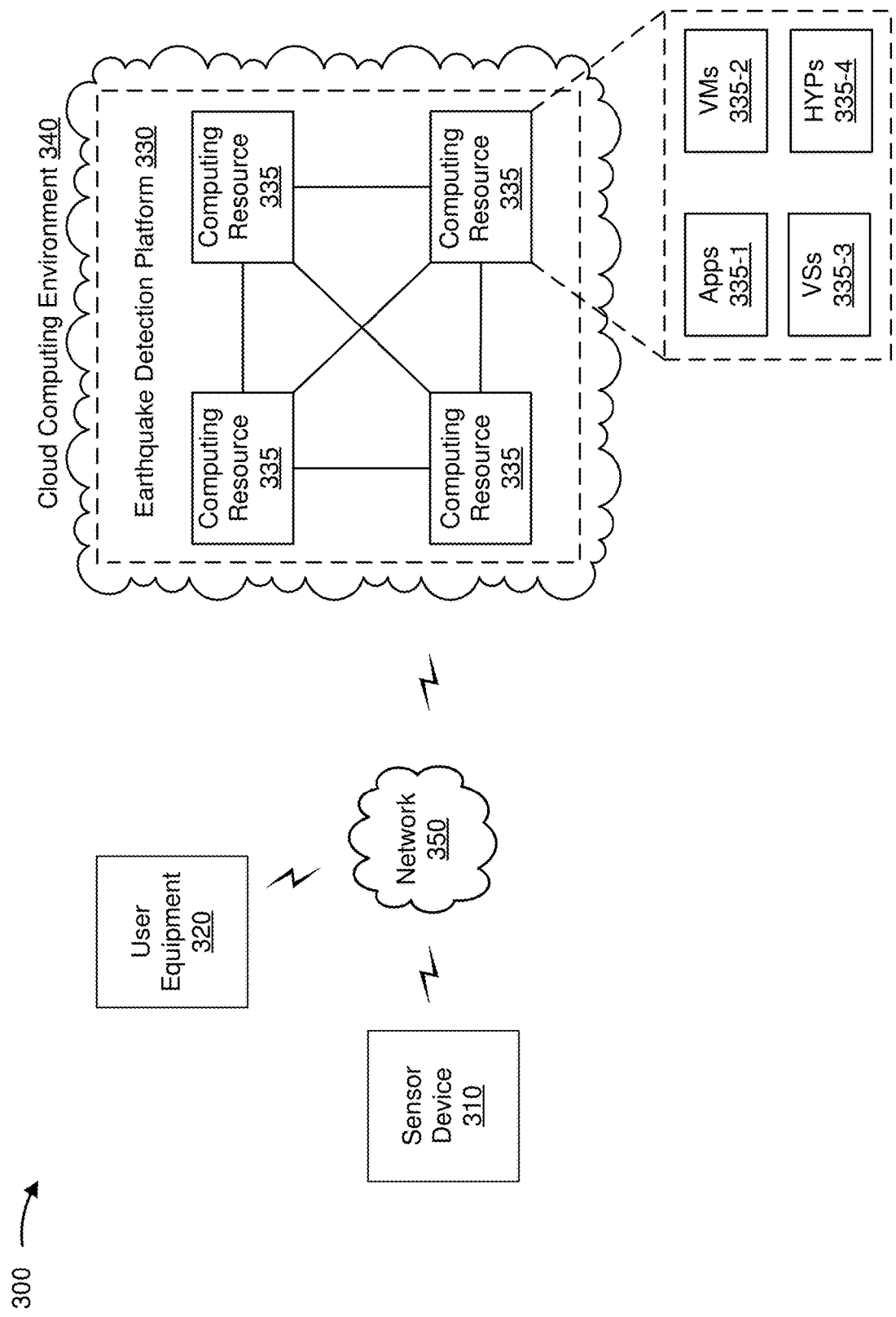
FIG. 3 is a diagram of an example environment in which systems and/or methods described herein can be implemented.

FIG. 3 is a diagram of an example environment 300 in which systems and/or methods, described herein, can be implemented. As shown sin FIG. 3, environment 300 can include a sensor device 310, a UE 320, an earthquake detection platform 330, a computing resource 335, a cloud computing environment 340, and a network 350. Devices of environment 300 can interconnect via wired connections, wireless connections, or a combination of wired and wireless connections.

Sensor device 310 includes one or more devices (e.g., electronic devices) capable of collecting and reporting readings (e.g., relating to vibrations). For example, sensor device 310 can include a computing device associated with a modem, a radio transceiver, an Ethernet interface, and/or the like (e.g., a telematics device, a smart phone, a tablet computer, a handheld computer, an IoT device, etc.), or a similar device capable of communication functions. In some implementations, sensor device 310 can include one or more sensors for detecting and/or collecting readings of a measurable parameter (e.g., a measurable parameter relating to vibrations). In some implementations, sensor device 310 can receive information from, and/or transmit information to, earthquake detection platform 330.

UE 320 includes one or more devices capable of communicating with a RAN and/or a data network (e.g., via a core network). For example, UE 320 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 320 can be capable of communicating using uplink (e.g., UE to RAN) communications, downlink (e.g., RAN to UE) communications, and/or sidelink (e.g., UE-to-UE) communications. In some implementations, UE 320 can include a machine-type communication (MTC) UE, such as an evolved or enhanced MTC (eMTC) UE. In some implementations, UE 320 can include an IoT UE, such as a narrowband IoT (NB-IoT) UE and/or the like.

Earthquake detection platform 330 includes one or more computing resources associated with processing vibrations detected by one or more sensor devices 310. For example, earthquake detection platform 330 can be a platform implemented by cloud computing environment 340 that can obtain sensor data collected by one or more remote devices (e.g., one or more sensor devices 310) and process the sensor data (e.g., determine whether the sensor data is likely to identify P-waves of a seismic event, predict a geographic area that is likely to be impacted by S-waves of the seismic event, transmit notifications and/or instructions relating to the seismic event, and/or the like).

Earthquake detection platform 330 can include one or more server devices. In some implementations, earthquake detection platform 330 is implemented by computing resources 335 of cloud computing environment 340. Notably, while implementations described herein describe earthquake detection platform 330 as being hosted in cloud computing environment 340, in some implementations, earthquake detection platform 330 might not be cloud-based or can be partially cloud-based.

Cloud computing environment 340 includes an environment that delivers computing as a service, whereby shared resources, services, etc. can be provided to sensor device 310, UE 320, and/or the like. Cloud computing environment 340 can provide computation, software, data access, storage, and/or other services that do not require end-user knowledge of a physical location and configuration of a system and/or a device that delivers the services. As shown, cloud computing environment 340 can include earthquake detection platform 330 and computing resource 335.

Computing resource 335 includes one or more personal computers, workstation computers, server devices, or another type of computation and/or communication device. In some implementations, computing resource 335 can host earthquake detection platform 330. The cloud resources can include compute instances executing in computing resource 335, storage devices provided in computing resource 335, data transfer devices provided by computing resource 335, etc. In some implementations, computing resource 335 can communicate with other computing resources 335 via wired connections, wireless connections, or a combination of wired and wireless connections.

As further shown in FIG. 3, computing resource 335 can include a group of cloud resources, such as one or more applications ("APPs") 335-1, one or more virtual machines ("VMs") 335-2, virtualized storage ("VSs") 335-3, one or more hypervisors ("HYPs") 335-4, or the like.

Application 335-1 includes one or more software applications. For example, application 335-1 can include software associated with earthquake detection platform 330 and/or any other software capable of being provided via cloud computing environment 340. In some implementations, one application 335-1 can send/receive information to/from one or more other applications 335-1, via virtual machine 335-2.

Virtual machine 335-2 includes a software implementation of a machine (e.g., a computer) that executes programs like a physical machine. Virtual machine 335-2 can be either a system virtual machine or a process virtual machine, depending upon use and degree of correspondence to any real machine by virtual machine 335-2. A system virtual machine can provide a complete system platform that supports execution of a complete operating system ("OS"). A process virtual machine can execute a single program and can support a single process. In some implementations, virtual machine 335-2 can execute on behalf of a user, and can manage infrastructure of cloud computing environment 340, such as data management, synchronization, or long-duration data transfers.

Virtualized storage 335-3 includes one or more storage systems and/or one or more devices that use virtualization techniques within the storage systems or devices of computing resource 335. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 335-4 provides hardware virtualization techniques that allow multiple operating systems (e.g., "guest operating systems") to execute concurrently on a host computer, such as computing resource 335. Hypervisor 335-4 can present a virtual operating platform to the guest operating systems and can manage the execution of the guest operating systems. Multiple instances of a variety of operating systems can share virtualized hardware resources.

Network 350 includes one or more wired and/or wireless networks. For example, network 350 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
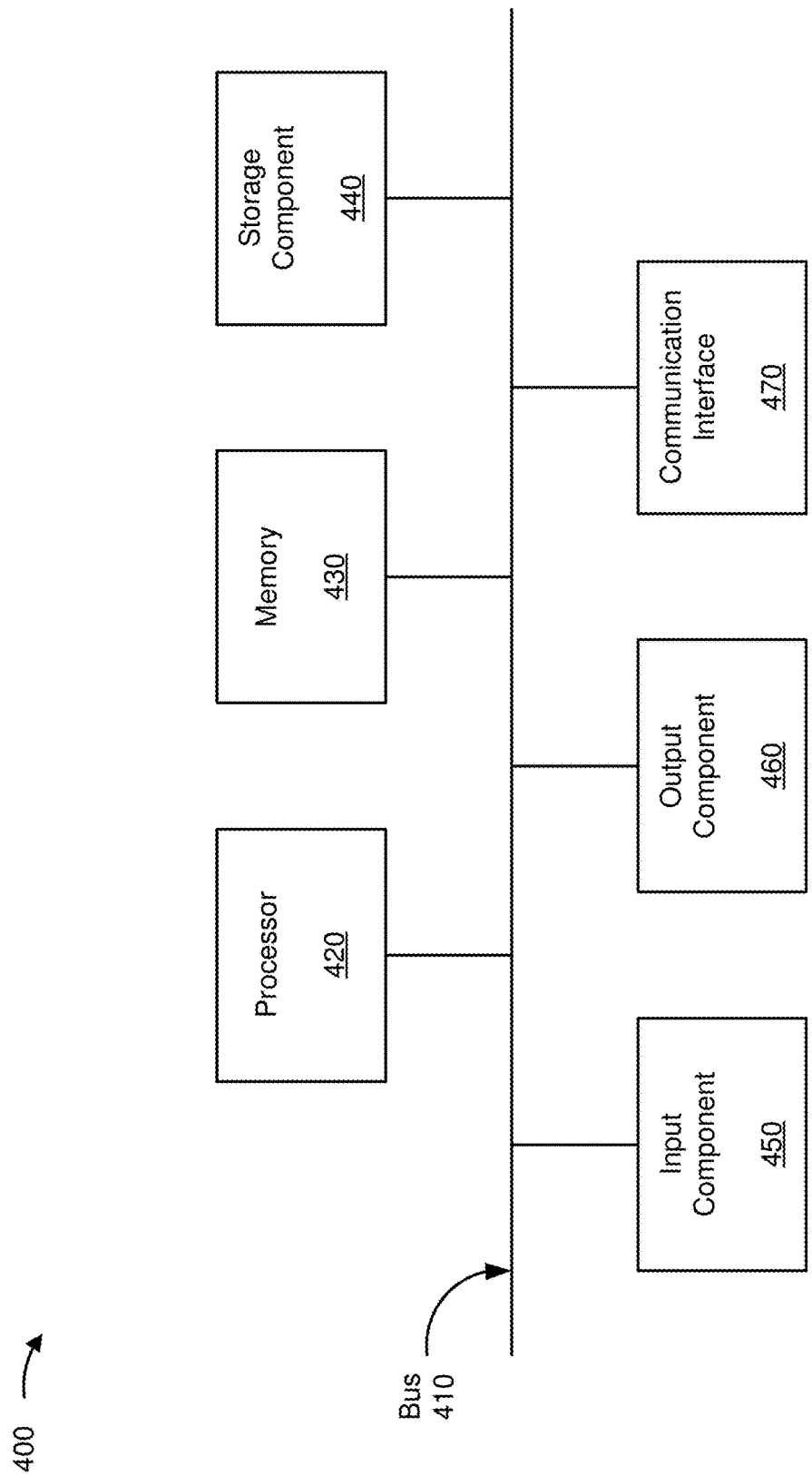
FIG. 4 is a diagram of example components of one or more devices of FIG. 3.

FIG. 4 is a diagram of example components of a device 400. Device 400 can correspond to sensor device 310, UE 320, earthquake detection platform 330, and/or computing resource 335. In some implementations sensor device 310, UE 320, earthquake detection platform 330, and/or computing resource 335 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, and/or the like.

Device 400 can perform one or more processes described herein. Device 400 can perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
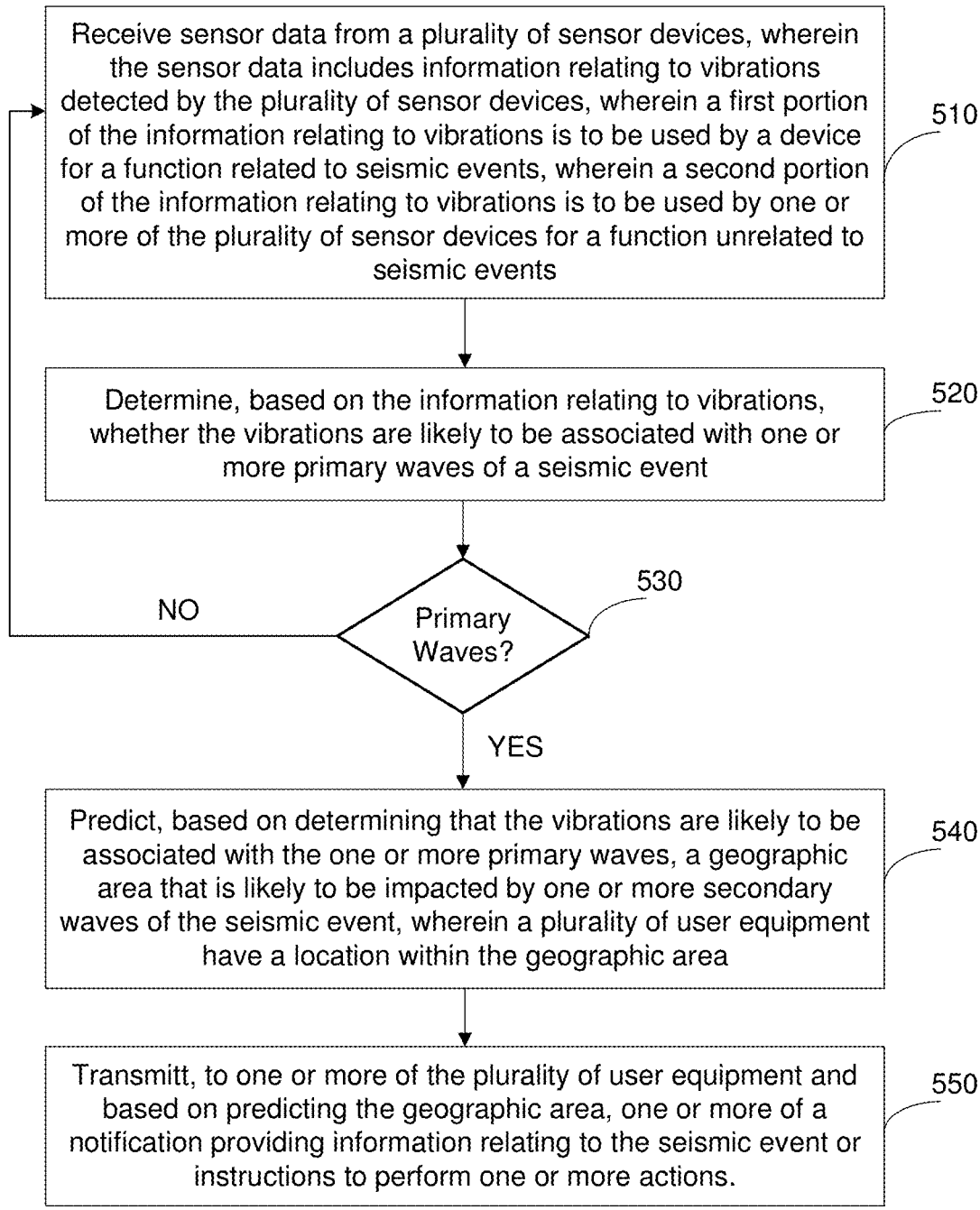
FIG. 5 is a flow chart of an example process for earthquake detection.

FIG. 5 is a flow chart of an example process 500 for earthquake detection. In some implementations, one or more process blocks of FIG. 5 can be performed by an earthquake detection platform (e.g., earthquake detection platform 330). In some implementations, one or more process blocks of FIG. 5 can be performed by another device or a group of devices separate from or including the earthquake detection platform, such as a sensor device (e.g., sensor device 310), a UE (e.g., UE 320), a computing resource (e.g., computing resource 335), and/or the like.

As shown in FIG. 5, process 500 can include receiving sensor data from a plurality of sensor devices, wherein the sensor data includes information relating to vibrations detected by the plurality of sensor devices, wherein a first portion of the information relating to vibrations is to be used by a device for a function related to seismic events, and wherein a second portion of the information relating to vibrations is to be used by one or more of the plurality of sensor devices for a function unrelated to seismic events (block 510). For example, the earthquake detection platform (e.g., using processor 420, memory 430, storage component 440, input component 450, communication interface 470, and/or the like) can receive sensor data from a plurality of sensor devices, as described above. In some aspects, the sensor data includes information relating to vibrations detected by the plurality of sensor devices. In some aspects, a first portion of the information relating to vibrations is to be used by a device for a function related to seismic events.

In some aspects, a second portion of the information relating to vibrations is to be used by one or more of the plurality of sensor devices for a function unrelated to seismic events.

As further shown in FIG. 5, process 500 can include determining, based on the information relating to vibrations, whether the vibrations are likely to be associated with one or more primary waves of a seismic event (block 520). For example, the earthquake detection platform (e.g., using processor 420, memory 430, storage component 440, and/or the like) can determine, based on the information relating to vibrations, whether the vibrations are likely to be associated with one or more primary waves of a seismic event, as described above.

As further shown in FIG. 5, if the earthquake detection platform determines that the vibrations are not likely to be associated with one or more primary waves (block 530-NO), the process 500 can include returning to block 510. For example, if the earthquake detection platform determines that the vibrations are not likely to be associated with one or more primary waves, then process 500 can include receiving sensor data from a plurality of sensor devices, as described above.

As further shown in FIG. 5, if the earthquake detection platform determines that the vibrations are likely to be associated with one or more primary waves (block 530-YES), then process 500 can include predicting, based on determining that the vibrations are likely to be associated with the one or more primary waves, a geographic area that is likely to be impacted by one or more secondary waves of the seismic event, wherein a plurality of user equipments have a location within the geographic area (block 540). For example, the earthquake detection platform (e.g., using processor 420, memory 430, storage component 440, and/or the like) can predict, based on determining that the vibrations are likely to be associated with the one or more primary waves, a geographic area that is likely to be impacted by one or more secondary waves of the seismic event, as described above. In some aspects, a plurality of user equipments have a location within the geographic area.

As further shown in FIG. 5, process 500 can include transmitting, to one or more of the plurality of user equipments and based on predicting the geographic area, one or more of a notification providing information relating to the seismic event or instructions to perform one or more actions (block 550). For example, the earthquake detection platform (e.g., using processor 420, memory 430, storage component 440, output component 460, communication interface 470, and/or the like) can transmit, to one or more of the plurality of user equipments and based on predicting the geographic area, one or more of a notification providing information relating to the seismic event or instructions to perform one or more actions, as described above.

Process 500 can include additional implementations, such as any single implementation or any combination of implementations described below and/or in connection with one or more other processes described elsewhere herein.

In some implementations, when determining whether the vibrations are likely to be associated with the one or more primary waves, the earthquake detection platform can determine, using a machine-learning model, whether the vibrations are likely to be associated with the one or more primary waves, where the machine-learning model is to output an indication whether the vibrations are likely to be associated with the one or more primary waves based on the information relating to vibrations. In some implementations, when predicting the geographic area that is likely to be impacted by the one or more secondary waves, the earthquake detection platform can predict, using a machine-learning model, the geographic area that is likely to be impacted by the one or more secondary waves, where the machine-learning model is to output information identifying the geographic area based on the information relating to vibrations.

In some implementations, the information relating to vibrations can include a first location and time of a first vibration detected by a first sensor device and a second location and time of a second vibration detected by a second sensor device. In some implementations, when determining whether the vibrations are likely to be associated with one or more primary waves, the earthquake detection platform can determine whether the vibrations are likely to be associated with one or more primary waves based on the first location and time and the second location and time, and when predicting the geographic area that is likely to be impacted by the one or more secondary waves, the earthquake detection platform can predict the geographic area that is likely to be impacted by the one or more secondary waves based on the first location and time and the second location and time. In some implementations, the information relating to the seismic event of the notification can include an estimated time until impact of the one or more secondary waves, where the estimated time can be based on the first location and time, the second location and time, and a location of the geographic area.

In some implementations, the function unrelated to seismic events can be related to one or more of vehicle tracking, vehicle diagnostics, roadway traffic management, vehicle parking management, or home appliance control. In some implementations, the earthquake detection platform can be associated with a base station of a radio access network, where the base station serves the plurality of user equipments.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, sensor data from a plurality of sensor devices,
      wherein the sensor data includes information relating to vibrations detected by the plurality of sensor devices,
         wherein a first portion of the information relating to vibrations is to be used by the device for a function related to seismic events,
         wherein a second portion of the information relating to vibrations is to be used by one or more of the plurality of sensor devices for a function unrelated to seismic events;
      determining, by the device and based on the first portion of the information relating to vibrations and the second portion of the information relating to vibrations, whether the vibrations are likely to be associated with one or more primary waves of a seismic event;
   predicting, by the device and based on determining that the vibrations are likely to be associated with the one or more primary waves, a geographic area that is likely to be impacted by one or more secondary waves of the seismic event,
      wherein a plurality of user equipments have a location within the geographic area; and
   transmitting, by the device to one or more of the plurality of user equipments and based on predicting the geographic area, one or more of:
      a notification providing information relating to the seismic event, or
      instructions to perform one or more actions.

2. The method of claim 1, wherein determining whether the vibrations are likely to be associated with the one or more primary waves comprises:
   determining, using a machine-learning model, whether the vibrations are likely to be associated with the one or more primary waves,
      wherein the machine-learning model is to output an indication whether the vibrations are likely to be associated with the one or more primary waves based on the information relating to vibrations.

3. The method of claim 1, wherein predicting the geographic area that is likely to be impacted by the one or more secondary waves comprises:
   predicting, using a machine-learning model, the geographic area that is likely to be impacted by the one or more secondary waves,
      wherein the machine-learning model is to output information identifying the geographic area based on the information relating to vibrations.

4. The method of claim 1, wherein the information relating to vibrations includes a first location and time of a first vibration detected by a first sensor device and a second location and time of a second vibration detected by a second sensor device,
   wherein determining whether the vibrations are likely to be associated with one or more primary waves comprises:
      determining whether the vibrations are likely to be associated with one or more primary waves based on the first location and time and the second location and time,
   wherein predicting the geographic area that is likely to be impacted by the one or more secondary waves comprises:
      predicting the geographic area that is likely to be impacted by the one or more secondary waves based on the first location and time and the second location and time.

5. The method of claim 1, wherein the information relating to vibrations includes a first location and time of a first vibration detected by a first sensor device and a second location and time of a second vibration detected by a second sensor device,
   wherein the information relating to the seismic event of the notification includes an estimated time until impact of the one or more secondary waves,
      wherein the estimated time is based on the first location and time, the second location and time, and a location of the geographic area.

6. The method of claim 1, wherein the function unrelated to seismic events is related to one or more of:
   vehicle tracking,
   vehicle diagnostics,
   roadway traffic management,
   vehicle parking management, or
   home appliance control.

7. The method of claim 1, wherein the device is associated with a base station of a radio access network, wherein the base station serves the plurality of user equipments.

8. A device, comprising:
   one or more memories; and
   one or more processors, communicatively coupled to the one or more memories, to:
      receive sensor data from a plurality of sensor devices, wherein the sensor data includes information relating to vibrations detected by the plurality of sensor devices,
  wherein a first portion of the information relating to vibrations is to be used by the device for a function related to seismic events,
  wherein a second portion of the information relating to vibrations is to be used by one or more of the plurality of sensor devices for a function unrelated to seismic events;
determine, based on the first portion of the information relating to vibrations and the second portion of the information relating to vibrations, whether the vibrations are likely to be associated with one or more primary waves of a seismic event;
predict, based on determining that the vibrations are likely to be associated with the one or more primary waves, a geographic area that is likely to be impacted by one or more secondary waves of the seismic event,
  wherein a plurality of user equipments have a location within the geographic area; and
transmit, based on predicting the geographic area, one or more of:
  a notification providing information relating to the seismic event, or
  instructions to perform one or more actions.

9. The device of claim 8, wherein the one or more processors, when determining whether the vibrations are likely to be associated with the one or more primary waves, are to:
determine, using a machine-learning model, whether the vibrations are likely to be associated with the one or more primary waves,
  wherein the machine-learning model is to output an indication whether the vibrations are likely to be associated with the one or more primary waves based on the information relating to vibrations.

10. The device of claim 8, wherein the one or more processors, when predicting the geographic area that is likely to be impacted by the one or more secondary waves, are to:
predict, using a machine-learning model, the geographic area that is likely to be impacted by the one or more secondary waves,
  wherein the machine-learning model is to output information identifying the geographic area based on the information relating to vibrations.

11. The device of claim 8, wherein the information relating to vibrations includes a first location and time of a first vibration detected by a first sensor device and a second location and time of a second vibration detected by a second sensor device,
wherein the one or more processors, when determining whether the vibrations are likely to be associated with one or more primary waves, are to:
  determine whether the vibrations are likely to be associated with one or more primary waves based on the first location and time and the second location and time,
wherein the one or more processors, when predicting the geographic area that is likely to be impacted by the one or more secondary waves, are to:
  predict the geographic area that is likely to be impacted by the one or more secondary waves based on the first location and time and the second location and time.

12. The device of claim 8, wherein the information relating to vibrations includes a first location and time of a first vibration detected by a first sensor device and a second location and time of a second vibration detected by a second sensor device,
wherein the information relating to the seismic event of the notification includes an estimated time until impact of the one or more secondary waves,
  wherein the estimated time is based on the first location and time, the second location and time, and a location of the geographic area.

13. The device of claim 8, wherein the function unrelated to seismic events is related to one or more of:
vehicle tracking,
vehicle diagnostics,
roadway traffic management,
vehicle parking management, or
home appliance control.

14. The device of claim 8, wherein the device is associated with a base station of a radio access network,
wherein the base station serves the plurality of user equipments.

15. A non-transitory computer-readable medium storing instructions, the instructions comprising:
one or more instructions that, when executed by one or more processors, cause the one or more processors to:
  receive sensor data from a plurality of sensor devices,
    wherein the sensor data includes information relating to vibrations detected by the plurality of sensor devices,
      wherein a first portion of the information relating to vibrations is to be used by the device for a function related to seismic events,
      wherein a second portion of the information relating to vibrations is to be used by one or more of the plurality of sensor devices for a function unrelated to seismic events;
  determine, based on the first portion of the information relating to vibrations and the second portion of the information relating to vibrations, whether the vibrations are likely to be associated with one or more primary waves of a seismic event;
  predict, based on determining that the vibrations are likely to be associated with the one or more primary waves, a geographic area that is likely to be impacted by one or more secondary waves of the seismic event,
    wherein a plurality of user equipments have a location within the geographic area; and
  transmit, based on predicting the geographic area, one or more of:
    a notification providing information relating to the seismic event, or
    instructions to perform one or more actions.

16. The non-transitory computer-readable medium of claim 15, wherein the one or more instructions, that cause the one or more processors to determine whether the vibrations are likely to be associated with the one or more primary waves, cause the one or more processors to:
determine, using a machine-learning model, whether the vibrations are likely to be associated with the one or more primary waves,
  wherein the machine-learning model is to output an indication whether the vibrations are likely to be associated with the one or more primary waves based on the information relating to vibrations.

17. The non-transitory computer-readable medium of claim 15, wherein the one or more instructions, that cause the one or more processors to predict the geographic area that is likely to be impacted by the one or more secondary waves, cause the one or more processors to:
predict, using a machine-learning model, the geographic area that is likely to be impacted by the one or more secondary waves,
wherein the machine-learning model is to output information identifying the geographic area based on the information relating to vibrations.

18. The non-transitory computer-readable medium of claim 15, wherein the information relating to vibrations includes a first location and time of a first vibration detected by a first sensor device and a second location and time of a second vibration detected by a second sensor device,
wherein the one or more instructions, that cause the one or more processors to determine whether the vibrations are likely to be associated with one or more primary waves, cause the one or more processors to:
determine whether the vibrations are likely to be associated with one or more primary waves based on the first location and time and the second location and time,
wherein the one or more instructions, that cause the one or more processors to predict the geographic area that is likely to be impacted by the one or more secondary waves, cause the one or more processors to:
predict the geographic area that is likely to be impacted by the one or more secondary waves based on the first location and time and the second location and time.

19. The non-transitory computer-readable medium of claim 15, wherein the information relating to vibrations includes a first location and time of a first vibration detected by a first sensor device and a second location and time of a second vibration detected by a second sensor device,
wherein the information relating to the seismic event of the notification includes an estimated time until impact of the one or more secondary waves,
wherein the estimated time is based on the first location and time, the second location and time, and a location of the geographic area.

20. The non-transitory computer-readable medium of claim 15, wherein the function unrelated to seismic events is related to one or more of:
vehicle tracking,
vehicle diagnostics,
roadway traffic management,
vehicle parking management, or
home appliance control.

* * * * *